US006003792A

United States Patent [19]

Munezane et al.

[11] Patent Number: 6,003,792

[45] Date of Patent: Dec. 21, 1999

[54] CYLINDER INJECTION TYPE FUEL INJECTION VALVE

[75] Inventors: Tsuyoshi Munezane; Kensuke Imada, both of Kobe; Masayuki Aota; Mamoru Sumida, both of Tokyo, all of Japan

[73] Assignee: Mitsubishi Denki Kabushiki Kaisha, Tokyo, Japan

[21] Appl. No.: 08/869,919

[22] Filed: Jun. 5, 1997

[30] Foreign Application Priority Data

Jul. 31, 1996 [JP] Japan .................................... 8-201679

[51] Int. Cl.[6] ............................... B05B 1/30; F16K 31/02

[52] U.S. Cl. ................................. 239/585.3; 251/129.21; 277/910

[58] Field of Search ............................. 239/585.1, 585.2, 239/585.3, 585.4, 585.5; 277/637, 644, 910; 251/129.21, 900

[56] References Cited

U.S. PATENT DOCUMENTS

| | | | |
|---|---|---|---|
| 4,264,040 | 4/1981 | Saito | 239/585.1 |
| 4,360,164 | 11/1982 | Bellicardi et al. | 239/585.5 |
| 4,585,174 | 4/1986 | Knapp | 239/585.1 |
| 5,197,428 | 3/1993 | Hornby | 239/585.3 |
| 5,263,649 | 11/1993 | Babitzka et al. | 239/585.4 |
| 5,749,527 | 5/1998 | Fujikawa et al. | 239/585.3 |

FOREIGN PATENT DOCUMENTS 7-103100 4/1995 Japan .

*Primary Examiner*—Andres Kashnikow
*Assistant Examiner*—Lisa Ann Douglas
*Attorney, Agent, or Firm*—Sughrue, Mion, Zinn, Macpeak & Seas, PLLC

[57] ABSTRACT

A cylinder injection type fuel injection valve 1 has a valve body 10 of a hollow cylindrical shape, a valve seat 12 having a fuel injection nozzle 11 at its center, which is disposed at an end of the valve body 10, a hollow housing 2 having an end connected to the valve body, which is capable of coming to contact with and separating from the valve seat 12 so as to open and close the injection nozzle 11, a core 3 disposed in the housing 2 and a coil assembly 4 disposed around the core 3 and inside the housing to cause opening and closing operations of the valve body 10, wherein an O-ring 14 is fitted to a space defined by the housing 2 and the core 3, in which the coil assembly 4 is disposed, at a side to which a fuel pressure is applied, so that the pressure is not applied to the coil assembly, or wherein a sealing ring having a hollow cylindrical shape 17 is fitted to a space defined by the housing 2 and the core 3, in which the coil assembly 4 is disposed, at a side to which a fuel pressure is applied, and an O-ring 18 is disposed at each side of the inside and the outside of the sealing ring 17.

20 Claims, 6 Drawing Sheets

CYLINDER INJECTION TYPE FUEL INJECTION VALVE

BACKGROUND OF THE INVENTION

1. Field of the Invention

The present invention relates to a cylinder injection type fuel injection valve to be attached to a cylinder head in order to directly inject fuel into a combustion chamber in an internal combustion engine.

2. Discussion of Background

A conventional cylinder injection type fuel injection valve has a general structure in a combination of an injection valve body with a needle valve and a solenoid for operating the needle valve. The solenoid comprises a housing, a core, a coil assembly and O-rings for sealing fuel which are provided between the coil assembly and the housing and between the coil and coil assembly so as to prevent fuel from leaking.

FIG. 24 is a cross-sectional view partly omitted showing an example of a conventional cylinder injection type fuel injection valve wherein numeral 31 designates a coil, numeral 32 designates a mold portion in a coil assembly, numeral 33 designates a core, numeral 34 designates a housing, numeral 35 designates an armature, numeral 36 designates a valve unit, and numerals 37, 38 designate O-rings.

In such cylinder injection type fuel injection valve attached to the cylinder head of a fuel engine so that fuel is directly injected into a fuel chamber, a quicker response is required. Accordingly, in order to obtain a high response characteristic, the coil is so made as to have a low resistance of 5Ω or less, or to increase a voltage to be applied, or to employ both the techniques.

In employment of the above-mentioned techniques, however, when an intense current of, for example, 3A or higher is passed, there causes a fault in a driving circuit or insulation breakdown. Further, in a case that an intense current is continuously passed for a certain time or more, the coil 31 (FIG. 24) generates heat, and the mold portion 32 of the coil assembly is softened or molten, whereby a gap is produced at a portion other than the sealing portion in the coil assembly thereby resulting leakage of fuel, or a surface of elements at a portion A or a portion B is deformed thereby causing leakage of fuel.

SUMMARY OF THE INVENTION

The present invention is to eliminate the above-mentioned problem and to provide a cylinder injection type fuel injection valve which prevents fuel from leaking even when the coil is heated and a mold portion of the coil assembly is softened or molten.

According to a first aspect of the invention, there is provided a cylinder injection type fuel injection valve comprising a valve body of a hollow cylindrical shape, a valve seat having a fuel injection nozzle at its center, which is disposed at an end of the valve body, a valve capable of coming to contact with and separating from the valve seat so as to open and close the injection nozzle, a hollow housing having an end connected to the valve body, a core disposed in the housing, and a coil assembly disposed around the core and inside the housing to cause opening and closing operations of the valve, wherein an O-ring is fitted to a space defined by the housing and the core, in which the coil assembly is disposed, at a side to which a fuel pressure is applied, so that the pressure is not applied to the coil assembly.

In the second or third aspect of the invention, there is provided a cylinder injection type fuel injection valve according to the first aspect, wherein the O-ring is an O-ring in an elliptical shape or a half-doughnut-like shape in cross section, which is disposed between an end of the coil assembly and the housing at a side to which a fuel pressure is applied.

In the fourth aspect of the invention, there is provided a cylinder injection type fuel injection valve comprising a valve body of a hollow cylindrical shape, a valve seat having a fuel injection nozzle at its center, which is disposed at an end of the valve body, a hollow housing having an end connected to the valve body, a valve capable of coming to contact with and separating from the valve seat so as to open and close the injection nozzle, a core disposed in the housing, and a coil assembly disposed around the core and inside the housing to cause opening and closing operations of the valve, wherein a sealing ring having a hollow cylindrical shape is fitted to a space defined by the housing and the core, in which the coil assembly is disposed, at a side to which a fuel pressure is applied, and an O-ring is disposed at each side of the inside and the outside of the sealing ring.

In the fifth aspect of the invention, there is provided a cylinder injection type fuel injection valve according to the fourth aspect, wherein a bobbin portion in the coil assembly and the sealing ring are formed in one piece with a heat-resisting resin.

In the sixth aspect of the invention, there is provided a cylinder injection type fuel injection valve according to the fourth aspect, wherein a plate is disposed between the sealing ring and the coil assembly.

In the seventh aspect of the invention, there is provided a cylinder injection type fuel injection valve according to the sixth aspect, wherein the sealing ring and the plate are formed in one piece with a heat-resisting resin.

In the eighth aspect of the invention, there is provided a cylinder injection type fuel injection valve according to the fourth aspect, wherein a plate is disposed between the sealing ring and the housing.

In the ninth aspect of the invention, there is provided a cylinder injection type fuel injection valve according to the eighth aspect, wherein the sealing ring and the plate are formed in one piece in a heat-resisting resin.

In the tenth aspect of the invention, there is provided a cylinder injection type fuel injection valve according to the fourth aspect, wherein a plate is disposed between the sealing ring and the coil assembly and between the sealing ring and the housing respectively.

In the eleventh aspect of the invention, there is provided a cylinder injection type fuel injection valve according to the tenth aspect, wherein the sealing ring and the plates disposed at both sides of the cylindrical rings are formed in one piece with a heat-resisting resin.

In the twelfth aspect of the invention, there is provided a cylinder injection type fuel injection valve according to the sixth aspect, wherein a plurality of projections are formed along a circular line in the coil assembly at a side facing the plate.

In the thirteenth aspect of the invention, there is provided a cylinder injection type fuel injection valve according to the sixth aspect, wherein a plurality of projections are formed along a circular line in the plate disposed between the sealing ring and the coil assembly at a side facing the coil assembly.

In the fourteenth aspect of the invention, there is provided a cylinder injection type fuel injection valve according to the sixth aspect, wherein a plurality of projections are formed in the plate disposed between the sealing ring and the coil assembly at a side facing the coil assembly or in the coil assembly at a side facing the plater so as to oppose the cylindrical ring.

In the fifteenth aspect of the invention, there is provided a cylinder injection type fuel injection valve according to the sixth aspect, wherein a plurality of projections are formed in the sealing ring so as to extend in a direction of the axis of injection nozzle.

In the sixteenth aspect of the invention, there is provided a cylinder injection type fuel injection valve according to the eighth aspect, wherein a plurality of projections are formed along a circular line in the plate disposed between the sealing ring and the hosing at a side facing the housing.

In the seventeenth aspect of the invention, there is provided a cylinder injection type fuel injection valve according to the sixth aspect, wherein a plurality of projections are formed in the plate disposed between the sealing ring and the the housing at a side facing the sealing ring or the back side.

In the eighteenth aspect of the invention, there is provided a cylinder injection type fuel injection valve according to the eighth aspect, wherein a plurality of projections are formed along a circular line in each of upper and lower surfaces of the plate disposed between the sealing ring and the hosing.

In the nineteenth aspect of the invention, there is provided a cylinder injection type fuel injection valve according to the eighteenth aspect, wherein a plurality of projections are formed along a circular line in each of upper and lower surfaces of the plate disposed between the sealing ring and the hosing at positions facing the cylindrical ring.

In the twentieth aspect of the invention, there is provided a cylinder injection type fuel injection valve according to the tenth aspect, wherein a plurality of projections are formed along a circular line in the plate disposed between the sealing ring and the coil assembly at a side facing the coil assembly, and a plurality of projections are formed along a circular line in the plate disposed between the sealing ring and the housing at a side facing the housing.

In the twenty-first aspect of the invention, there is provided a cylinder injection type fuel injection valve according to the twentieth aspect, wherein a plurality of projections are formed along a circular line in the plate disposed between the sealing ring and the coil assembly at a side facing the sealing ring, and a plurality of projections are formed along a circular line on the plate disposed between the sealing ring and the housing at a side facing the sealing ring.

In the twenty-second invention, there is provided a cylinder injection type fuel injection valve according to the twelfth through the twenty-first aspects, wherein the hardness of a material for the projections is higher than the hardness of a material to which the projections contact.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
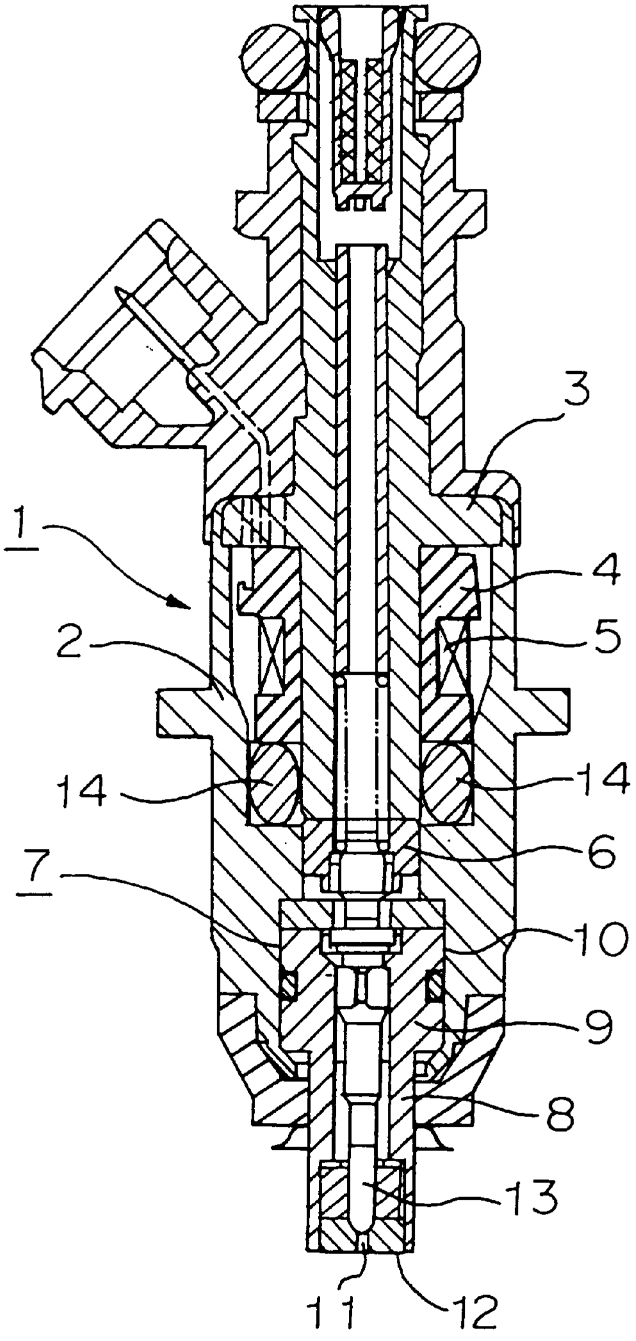
FIG. 1 is a longitudinal cross-sectional view of a cylinder injection type fuel injection valve according to an embodiment of the present invention.

Preferred embodiments of the cylinder injection type fuel injection valve of the present invention will be described in detail with reference to the drawings wherein the same reference numerals designate the same and corresponding parts.

A first embodiment of the invention will be described. In FIG. 1, a cylinder injection type fuel injection valve 1 comprises a housing 2, a core 3, a coil assembly 4, a coil 5, an armature 6 and a valve unit 7. The valve unit 7 is connected to an end of the housing 2 by a connecting means such as caulking. Further, the valve unit 7 comprises a valve body 10 of a hollow cylindrical shape with a stepped portion including a cylindrical portion of small diameter 8 and a cylindrical portion of large diameter 9, a valve seat 12 provided with a fuel injection nozzle 11, which is firmly connected to a tip portion of the central opening of the valve body 10, and a needle valve 13 as a valve which is brought to contact with and separated from the valve seat 12 by means of a solenoid to open and close the fuel injection nozzle 11. An O-ring 14 disposed in a space defined by the housing and the core at a side to which a fuel pressure is applied, so as to be in contact with a lower end surface of the coil assembly 4.

The operations will be described. When an electric current is supplied to the coil, a magnetic flux is produced in a magnetic circuit constituted by the armature 6, the core 3 and the housing 2 whereby the armature 6 is moved by an attractive force toward the core 3. Then, the needle valve 13 firmly attached to the armature 6 is separated form the valve seat 12 to form a gap between the needle valve 13 and the valve seat 12. Highly pressurized fuel is passed from the valve body 10 through the gap at the valve sheet 12 to the injection nozzle 11 and is sprayed through the tip outlet of the nozzle 11.

During the above-mentioned operations, there is the possibility that an intense electric current flows continuously in the coil assembly 4 due to a failure in a driving circuit so that a part of the coil 4 and/or a mold portion of it is damaged by burning whereby a gap is produced in the mold portion. Even in such a case, fuel does not directly enter into the coil assembly 4 since the O-ring 14 is disposed so as to seal the fuel between the fuel passage of the fuel injection valve and the coil assembly 4 so that the fuel is prevented from leaking outside. Accordingly, even if a gap is produced at a portion other than a sealing portion in the coil assembly 4 due to a failure in a driving circuit and the like, which causes a continuous supply of an intense current for a certain time or more to thereby cause heat in the coil 5, such an abnormal state resulting the softening or melting a mold portion, leakage of fuel can be prevented.

Figure 2:
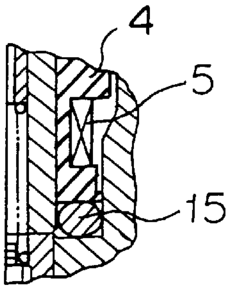
FIG. 2 is an enlarged cross-sectional view showing a sealing portion of a cylinder injection type fuel injection valve according to a second embodiment of the present invention.
Figure 3:
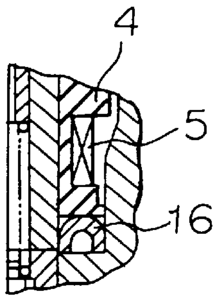
FIG. 3 is an enlarged cross-sectional view showing a sealing portion of a cylinder injection type fuel injection valve according to a modified form in the second embodiment of the present invention.

FIGS. 2 and 3 are enlarged cross-sectional views showing a sealing portion in each cylinder injection type fuel injection valve according to a second embodiment of the invention. In FIG. 2, an O-ring having an elliptic shape in cross section wherein a diametrical portion is elongated, is used. In FIG. 3, an O-ring having a special shape such as a half-doughnut-like shape in cross section is used. Since a magnetic flux passes an inner diameter portion of the housing 2 and the outer diameter portion of the core 3 in the cylinder injection type fuel injection valve, it is necessary for these elements to have a certain length in order to provide a sufficient magnetic force. When a sufficient sealing effect is provided by using a single O-ring, a space in the axial direction of the injection valve is fairly required. However, with use of the above-mentioned O-ring having an elliptical shape or a special shape such as a half-doughnut-like shape, the space in the axial direction can be reduced, whereby a cylinder injection type fuel injection valve of small size and high performance can be obtained.

Figure 5:
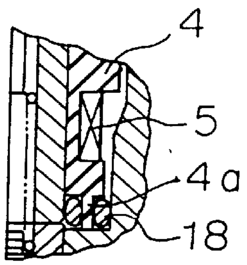
FIG. 5 is an enlarged cross-sectional view showing a sealing portion of a cylinder injection type fuel injection valve according to a modified form of the third embodiment of the present invention.
Figure 4:
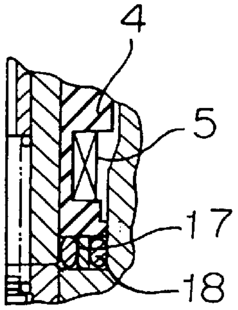
FIG. 4 is an enlarged cross-sectional view showing a sealing portion of a cylinder injection type fuel injection valve according to a third embodiment of the present invention.

FIGS. 4 and 5 show a third embodiment of the invention. In FIG. 4, a sealing ring 17 having a hollow cylindrical shape is disposed in a space defined by the housing 2 and the core 3, in which the coil assembly 4 is disposed, at a side to which a fuel pressure is applied, and an O-ring 18 is disposed at each of the inside and outside of the sealing ring 17 whereby a sufficient sealing effect can be provided. Thus, by using two O-rings, the diameter of the O-rings can be small so that the length of the space in the axial direction of the injection valve can be shortened. This embodiment can reduce the space in the axial direction in the same manner as in the second embodiment, and a cylinder injection type fuel injection valve of small size and high performance can be obtained.

FIG. 5 shows a modified form of the third embodiment wherein a bobbin portion of the coil assembly and the sealing ring are formed in a one piece body **4*a*** with a heat-resisting material. With such construction, an inexpensive cylinder injection type fuel injection valve is obtainable.

Figure 6:
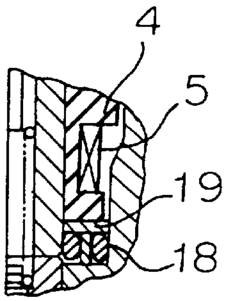
FIG. 6 is an enlarged cross-sectional view showing a sealing portion of a cylinder injection type fuel injection valve according to a fourth embodiment of the present invention.

FIG. 6 is an enlarged cross-sectional view showing a sealing portion of a cylinder injection type fuel injection valve according to a fourth embodiment of the invention. In FIG. 6, a plate 19 made of metal or a heat-resisting resin is disposed between the coil assembly 4 and a sealing member such as the O-ring 18. By interposing the plate 19, heat can be isolated whereby leakage of fuel in an abnormal state can certainly be prevented.

Figure 7:
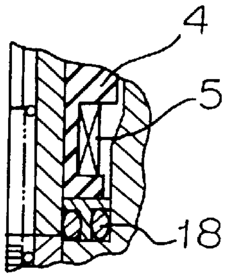
FIG. 7 is an enlarged cross-sectional view showing a sealing portion of a cylinder injection type fuel injection valve according to a modified form of the fourth embodiment of the present invention.

Further, as shown in FIG. 7, a sealing ring (which corresponds to the member **4*a* in FIG. 5) and the plate 19** may be formed in one piece with a heat-resisting resin. With such construction, leakage of fuel in an abnormal state can certainly be prevented, and an inexpensive cylinder injection type fuel injection valve can be provided.

Figure 8:
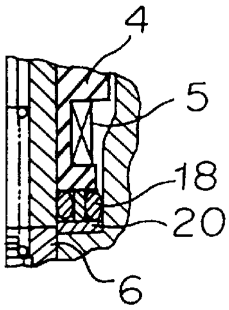
FIG. 8 is an enlarged cross-sectional view showing a sealing portion of a cylinder injection type fuel injection valve according to a fifth embodiment of the present invention.

FIG. 8 shows a fifth embodiment of the invention. A plate 20 is to separate a section in which the O-rings 18 are fitted from the armature 6. The purpose of the plate 20 is to prevent the sealing portion such as the O-rings 18 and so on from extending toward the armature 6 as a movable member. According to this embodiment, the O-rings 18 can be prevented from extending to a movable section, whereby a faultless cylinder injection type fuel injection valve can be obtained.

Figure 9:
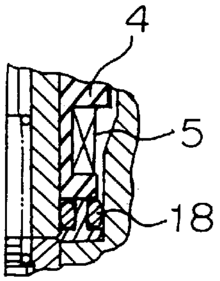
FIG. 9 is an enlarged cross-sectional view showing a sealing portion of a cylinder injection type fuel injection valve according to a modified form of the fifth embodiment of the present invention.

Further, as shown in FIG. 9, a sealing ring (corresponding to 4*a* in FIG. 5) are formed in one piece with a heat-resisting resin, whereby a faultless, inexpensive cylinder injection type fuel injection valve is obtainable.

Further, the plate 19 for isolating heat used in the fourth embodiment can be used in addition to the plate 20.

Figure 10:
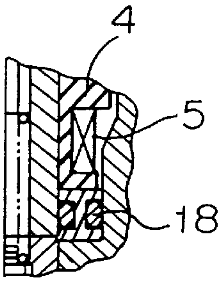
FIG. 10 is an enlarged cross-sectional view showing a sealing portion of a cylinder injection type fuel injection valve according to a modified form of the fifth embodiment of the invention.

FIG. 10 shows a modified form of the fifth embodiment wherein a sealing ring (corresponding to 4*a* in FIG. 5), the plate 20 and the plate 19 for isolating heat as used in the fourth embodiment may be formed in one piece with a heat-resisting resin, whereby a further inexpensive cylinder injection type fuel injection valve can be obtained.

Figure 11:
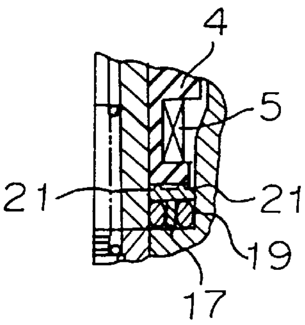
FIG. 11 is an enlarged cross-sectional view showing a sealing portion of a cylinder injection type fuel injection valve according to a sixth embodiment of the present invention.

FIG. 11 shows a sixth embodiment of the invention. A plurality of projections 21 are formed along a circular line in the coil assembly 4 at a side facing the plate 19 to thereby form an air layer between the coil assembly 4 and the plate 19. The formation of an air layer provides a thermal insulation layer and prevents leakage of fuel in an abnormal state. In addition, when the projections 21 are made of a deformable material, the deformation of the projections can absorb scattering in dimensional tolerance in the axial direction of the space defined by the housing 2 and the core 3 and in dimensional tolerance in the axial direction of the coil assembly 4, the plate 19 and the ring 17 which are disposed in the space. Therefore, a cylinder injection type fuel injection valve of less looseness and high reliability on a durable strength to vibrations can be obtained.

Figure 12:
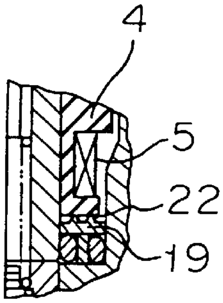
FIG. 12 is an enlarged cross-sectional view showing a sealing portion of a cylinder injection type fuel injection valve according to a modified form of the sixth embodiment of the invention.

Further, as shown in FIG. 12, a plurality of projections 22 may be formed along a circular line in the plate 19 at a side facing the coil assembly 4 to thereby form an air layer between the coil assembly 4 and the plate 19.

Figure 13:
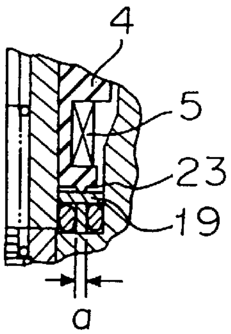
FIG. 13 is an enlarged cross-sectional view showing a sealing portion of a cylinder injection type fuel injection valve according to a seventh embodiment of the invention.
Figure 14:
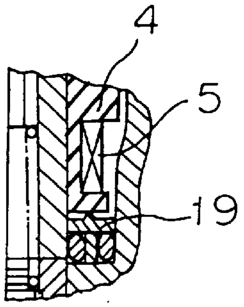
FIG. 14 is an enlarged cross-sectional view showing a sealing portion of a cylinder injection type fuel injection valve according to a modified form of the seventh embodiment of the invention.

FIG. 13 shows a seventh embodiment of the present invention. As shown in FIG. 13, projections 23 are formed in the coil assembly 4 at a side facing the plate 19 to thereby form an air layer therebetween. Further, the positions of the projections 23 in the radial direction with respect to the central axis of the valve body 13 are determined within a range of the width of the sealing ring (in a range indicated by a symbol a in FIG. 13) whereby the position with respect to in the axial direction of the coil assembly 4 received in the space defined by the housing 2 and the core 3 can be adjusted. With such arrangement, a load of assembled elements is applied to the sealing ring whereby deformation and cracking of the plate 19 can be prevented.

In the embodiment shown in FIG. 13, the projections 23 are formed in the coil assembly 4. However, the projections may be formed in the plate 19.

Figure 15:
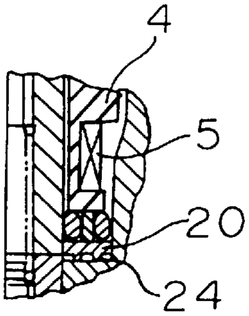
FIG. 15 is an enlarged cross-sectional view showing a sealing portion of a cylinder injection type fuel injection valve according to an eighth embodiment of the invention.

FIG. 15 shows an eighth embodiment of the present invention. As shown in FIG. 15, a plurality of projections 24 are formed along a circular line in a plate 20 (FIG. 8) which prevents O-rings from bulging-out, whereby the dimension in the axial direction of the coil assembly 4 received in the space can be adjusted.

Thus, dimensional errors in the axial direction of the structural elements after assembled can be absorbed by the projections 24, whereby a cylinder injection type fuel injection valve of high reliability on withstand strength to vibrations or the like can be provided.

Figure 16:
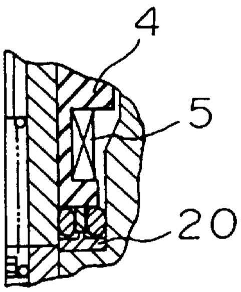
FIG. 16 is an enlarged cross-sectional view showing a sealing portion of a cylinder injection type fuel injection valve according to a modified form of the eighth embodiment of the invention.

As shown in FIG. 16, the positions of the projections 24 in the radial direction with respect to the center axis of the valve body may be determined to be within a range of width of the sealing ring so that the dimension in the axial direction of the coil assembly 4 can be adjusted. As a result, deformation and cracking of the plate can be prevented.

Figure 17:
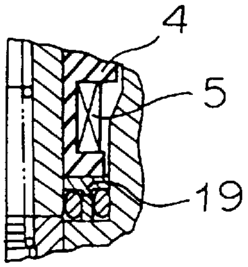
FIG. 17 is an enlarged cross-sectional view showing a sealing portion of a cylinder injection type fuel injection valve according to a modified form of the eighth embodiment of the invention.
Figure 18:
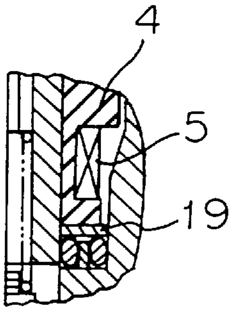
FIG. 18 is an enlarged cross-sectional view showing a sealing portion of a cylinder injection type fuel injection valve according to a modified form of the eighth embodiment of the invention.

FIG. 16 shows that the projections are formed in the plate 20 for preventing the O-rings from bulging out. However, projections may be formed in a heat-insulating plate 19 at positions within a width of a sealing ring as shown in FIG. 17. Further, projections may be formed in a sealing ring as shown in FIG. 18.

Figure 19:
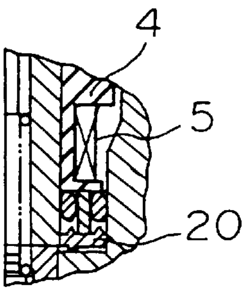
FIG. 19 is an enlarged cross-sectional view showing a sealing portion of a cylinder injection type fuel injection valve according to a ninth embodiment of the invention.

FIG. 19 shows a ninth embodiment of the present invention. In FIG. 19, projections are formed uniformly in both surfaces of a plate 20 for preventing O-rings from bulging out so that undesired movement of the coil assembly 4 in the axial direction can be absorbed.

By providing the projections at both surfaces of the plate 20, there is no danger of assembling errors since either surface of the plate can be used. Namely, since the plate has no directivity in assembling work, workability is improved and manufacturing cost can be reduced.

Figure 20:
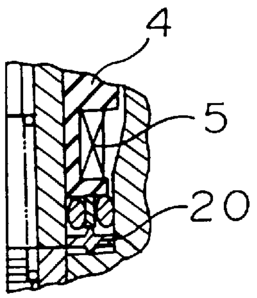
FIG. 20 is an enlarged cross-sectional view showing a sealing portion of a cylinder injection type fuel injection valve according to a modified form of the ninth embodiment of the invention.

Further, as shown in FIG. 20, projections may be formed uniformly in both surfaces of the plate 20 for preventing O-rings from bulging out to thereby absorb undesired movement of the coil assembly 4 in its axial direction wherein the positions of the projections should be determined within a range of the width of the sealing rings at a side facing the sealing rings.

With such construction, deformation and cracking of the plate can be prevented. In addition, either side of the plate 20 can be used in assembling work. In other words, the plate has no directivity in assembling. Accordingly, workability is improved and manufacturing cost for a cylinder injection type fuel injection valve is improved.

Figure 21:
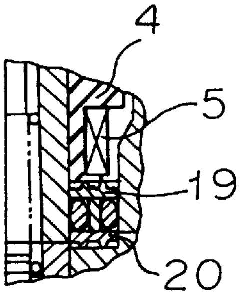
FIG. 21 is an enlarged cross-sectional view showing a sealing portion of a cylinder injection type fuel injection valve according to a tenth embodiment of the invention.

FIG. 21 shows a tenth embodiment of the invention, as shown in FIG. 21, projections for adjusting the dimension of the coil assembly 4 in the axial direction are formed in each of the plate 19 and the plate 20 which prevents the O-rings from buldging-out. Thus, errors in dimensions in the axial direction of the structural elements after assembled can be absorbed by the projections. Accordingly, a cylinder injection type fuel injection valve having high reliability on withstanding strength to vibrations or the like; having an air layer for insulating heat between the plate 19 and the coil assembly 4, and capable of preventing fuel-leakage in an abnormal state, can be obtained.

Figure 22:
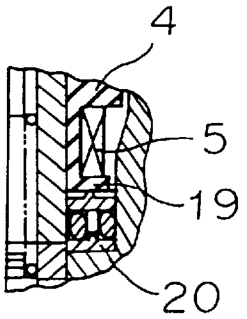
FIG. 22 is an enlarged cross-sectional view showing a sealing portion of a cylinder injection type fuel injection valve according to a modified form of the tenth embodiment of the invention.

Further, as shown in FIG. 22, the positions of the projections in a radial direction with respect to the center axis of the valve body may be formed within a range of the width of the sealing ring whereby deformation and cracking in the plate can be prevented.

Figure 23:
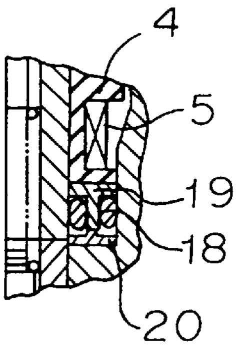
FIG. 23 is an enlarged cross-sectional view showing a sealing portion of a cylinder injection type fuel injection valve according to an eleventh embodiment of the invention.
Figure 24:
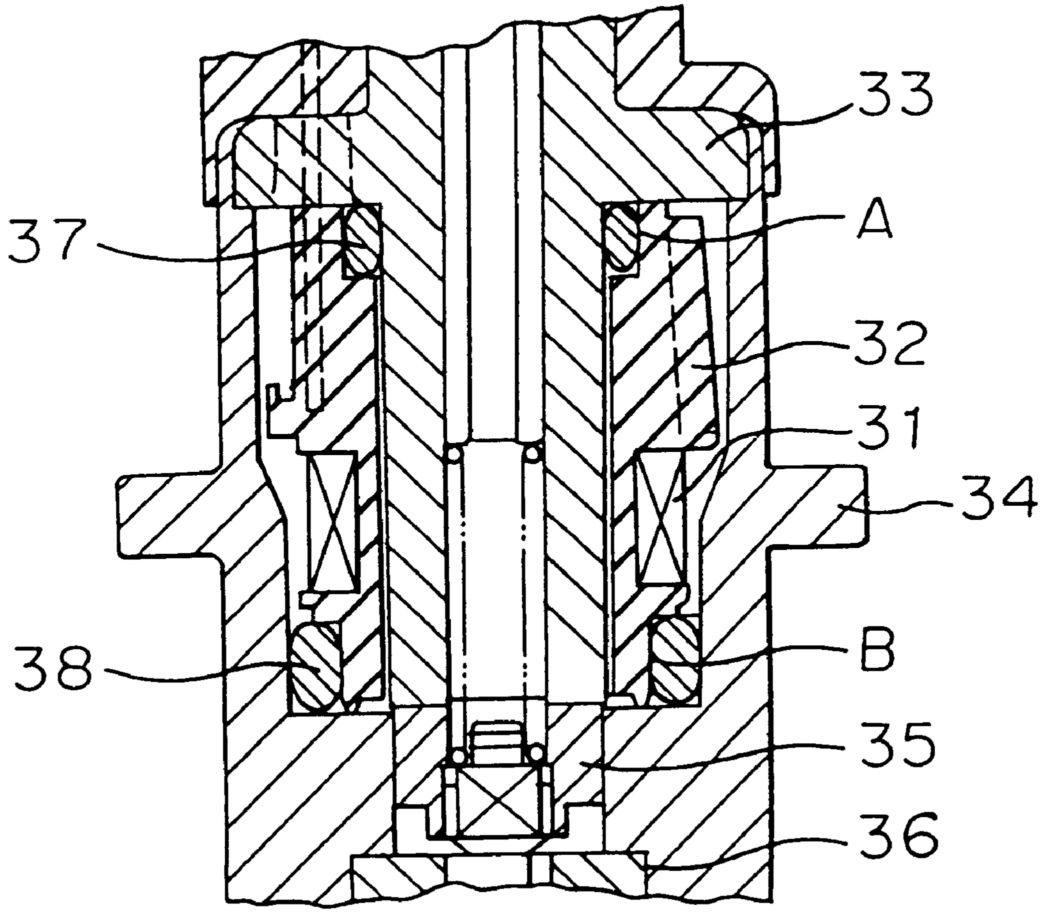
FIG. 24 is an enlarged cross-sectional view partly omitted of a conventional cylinder injection type fuel injection valve.

FIG. 23 shows an eleventh embodiment of the present invention. The hardness of a material for projections for adjusting the dimensions in the axial direction of the structural elements is made higher than the hardness of a material to which the projections contact. In a specified case shown in FIG. 23, the hardness of the plate 19 is higher than the hardness of the plate 20. When there is a difference between the hardness of the materials used, the projections formed in either material are deformed to improve assembling work. Further, cracking of the material during assembling work can be prevented and a desired deformation is obtainable at a desired position. Specifically, the plate 19 may be a phenol resin and the plate 20 may be nylon.

Further, in the constructions shown in FIG. 11 to FIG. 22, the hardness of the projections for adjusting dimensions may be higher than the hardness of a material to which the projections contact.

According to the first aspect of the present invention wherein an O-ring is fitted to a space defined by a housing and a core, in which a coil assembly is disposed, at a side to which a fuel pressure is applied, leakage of fuel can be prevented even when an intense electric current is continuously passed to a coil for a certain time or more whereby a mold portion in the coil assembly is softened or molten due to heat generate in the coil.

In the second or third aspect of the invention wherein an O-ring in an elliptical shape or a half-doughnut-like shape in cross section is used, a space in the axial direction is reduced to thereby provide a cylinder injection type fuel injection valve of small size and high performance can be provided.

According to the fourth aspect of the present invention wherein a sealing ring having a cylindrical shape is disposed and an O-ring is disposed at inner and outer sides of the sealing ring, a space in the axial direction can be reduced to thereby provide a cylinder injection type fuel injection valve of small size and high performance.

According to the fifth aspect of the invention wherein a bobbin of the coil assembly and the sealing ring are formed in one piece with a heat-resisting resin, an inexpensive cylinder injection type fuel injection valve can be provided.

According to the sixth aspect of the invention wherein a plate is disposed between the sealing ring and the coil assembly, heat can be isolated and leakage of fuel in an abnormal state can certainly be prevented.

According to the seventh aspect of the invention wherein the sealing ring and the plate are formed in one piece with a heat-resisting resin, leakage of fuel in an abnormal state can certainly be prevented to thereby provide an inexpensive cylinder injection type fuel injection valve.

According to the eighth aspect of the invention wherein a plate is disposed between the sealing ring and the housing, there is no danger of buldging-out of an O-ring toward a movable portion, whereby a further faultless cylinder injection type fuel injection valve can be provided.

According to the ninth aspect of the invention wherein the sealing ring and the plate are formed in one piece with a heat-resisting resin, a further faultless and inexpensive cylinder injection type fuel injection valve can be obtained.

In the tenth aspect of the invention wherein a plate is disposed between the sealing ring and the coil assembly and between the sealing ring the hosing, the heat can be sealed; leakage of fuel in an abnormal state can certainly be prevented, and buldging-out of an O-ring can be prevented, whereby a further faultless cylinder injection type fuel injection valve can be provided.

According to the eleventh aspect of the invention wherein the plates and the sealing ring are formed in one piece with a heat-resisting resin, a further inexpensive cylinder injection type fuel injection valve can be obtained.

According to the twelfth aspect of the invention wherein a plurality of projections are formed along a circular line in the coil assembly at a side facing the plate, heat is isolated with an air layer by means of the projections, and leakage of fuel in an abnormal state can certainly be prevented. Further, errors in dimensions of structural elements disposed in a space defined by the housing and the core can be absorbed by the deformation of the projections, whereby a cylinder injection type fuel injection valve of highly reliable on withstanding strength to vibrations or the like can be obtained.

According to the thirteenth aspect of the invention wherein a plurality of projections are formed along a circular line in a plate disposed between the sealing ring and the coil assembly at a side facing the coil assembly, an air layer is formed to isolate heat whereby leakage of fuel in an abnormal state can certainly be prevented. Further, errors in dimension of the structural elements disposed in a space defined by the housing and the core can be absorbed by the deformation of the projections to provide higher reliability on withstanding resistance to vibrations or the like.

According to the fourteenth aspect of the invention wherein a plurality of projections are formed in a plate disposed between the sealing ring and the coil assembly at a side facing the coil assembly or in the coil assembly at a side facing the plate so as to oppose the position of the sealing ring, a load of the assembled elements is applied to the sealing ring whereby a deformation and breakage of the plate can be prevented.

According to the fifteenth aspect of the invention wherein projections are formed in the sealing ring and the axial direction of the injection nozzle. Accordingly, a load of the assembled elements is applied to the sealing ring whereby deformation and breakage of the plate can be prevented.

According to the sixteenth aspect of the invention, a plurality of projections are formed along a circular line in a plate disposed between the sealing ring and the housing at a side facing the housing. Accordingly, errors in dimension of the structural elements disposed in and around a space defined by the housing and the core can be absorbed by the deformation of the projections to thereby provide higher reliability on withstand strength to vibrations or the like.

According to the seventeenth aspect of the invention wherein projections are formed in both surfaces of a plate disposed between the sealing ring and the housing at positions corresponding to the sealing ring, deformation and breakage of the plate can be prevented.

According to the eighteenth aspect of the invention wherein a plurality of projections are formed along a circular line in upper and lower surfaces of a plate disposed between the sealing ring and the housing, either side of the plate can be used in assembling work whereby workability is improved and manufacturing cost can be reduced.

According to the nineteenth aspect of the invention wherein a plurality of projections are formed along a circular line in both surfaces of a plate disposed between the sealing ring and the housing at positions corresponding to the sealing ring, deformation and breakage of the plate can be prevented; workability in assembling work is improved, and assembling cost is reduced.

According to the twentieth aspect of the invention wherein a plurality of projections are formed along a circular line in a plate disposed between the sealing ring and the coil assembly at a side facing the coil assembly and a plurality of projections are formed along a circular line in a plate disposed between the sealing ring and the housing at a side facing the hosing, errors in dimension in the axial direction of the structural elements after assembled can be absorbed by means of the projections to provide a further high reliability on withstanding strength to vibrations or the like.

According to the twenty-first aspect of the invention wherein projections are formed in a plate disposed between the sealing ring and the coil assembly at positions corresponding to the sealing ring, and projections are formed along a circular line in a plate disposed between the circular ring and the housing at positions corresponding to the sealing ring, deformation and breakage of the plate can be prevented.

According to the twenty-second aspect of the invention wherein the hardness of a material for projections is higher than a material to which the projections are contact, the projections are easily deformed to thereby improve assembling work; prevent a damage in structural elements, and obtain the deformation of the projections at desired positions.

Obviously, numerous modifications and variations of the present invention are possible in light of the above teachings. It is therefore to be understood that within the scope of the appended claims, the invention may be practiced otherwise than as specifically described herein.

What is claimed is:

1. A cylinder injection type fuel injection valve comprising a valve body of a hollow cylindrical shape, a valve seat having a fuel injection nozzle at its center, which is disposed at an end of the valve body, a valve capable of coming to contact with and separating from the valve seat so as to open and close the injection nozzle, a hollow housing having an end connected to the valve body, a core disposed in the housing, and a coil assembly disposed around the core and inside the housing to cause opening and closing operations of the body, wherein an O-ring is fitted to a space defined by the housing and the core, in which the coil assembly is disposed, at a side to which a fuel pressure is applied, so that the pressure is not applied to the coil assembly, wherein the space in which the O-ring is fitted has two sides defined by the housing, one side defined by the core and another side defined by the coil assembly.

2. A cylinder injection type fuel injection valve according to claim 1, wherein the O-ring is an O-ring in an elliptical shape in cross section.

3. A cylinder injection type fuel injection valve according to claim 1, wherein the O-ring is an O-ring in a half-doughnut-like shape in cross section.

4. A cylinder injection type fuel injection valve comprising a valve body of a hollow cylindrical shape, a valve seat having a fuel injection nozzle at its center, which is disposed at an end of the valve body, a valve capable of coming to contact with and separating from the valve seat so as to open and close the injection nozzle, a hollow housing having an end connected to the valve body, a core disposed in the housing, and a coil assembly disposed around the core and inside the housing to cause opening and closing operations of the body, wherein a sealing ring having a hollow cylindrical shape is fitted to a space defined by the housing and the core, in which the coil assembly is disposed, at a side to which a fuel pressure is applied, and an O-ring is disposed at each side of the inside and the outside of the sealing ring wherein the space in which the sealing ring is fitted has two sides defined by the housing one side defined by the core and another side defined by the coil assembly.

5. A cylinder injection type fuel injection valve according to claim 4, wherein a bobbin portion in the coil assembly and the sealing ring are formed in one piece with a heat-resisting resin.

6. A cylinder injection type fuel injection valve comprising a valve body of a hollow cylindrical shape, a valve seat having a fuel injection nozzle at its center, which is disposed at an end of the valve body, a valve capable of coming to contact with and separating from the valve seat so as to open and close the injection nozzle, a hollow housing having an end connected to the valve body, a core disposed in the housing, and a coil assembly disposed around the core and inside the housing to cause opening and closing operations of the body, wherein a sealing ring having a hollow cylindrical shape is fitted to a space defined by the housing and the core, in which the coil assembly is disposed, at a side to which a fuel pressure is applied, and an O-ring is disposed at each side of the inside and the outside of the sealing ring, wherein a plate is disposed between the sealing ring and the coil assembly.

7. A cylinder injection type fuel injection valve according to claim 6, wherein the sealing ring and the plate are formed in one piece with a heat-resisting material.

8. A cylinder injection type fuel injection valve according to claim 6, wherein a plurality of projections are formed along a circular line in the coil assembly at a side facing the plate.

9. A cylinder injection type fuel injection valve according to claim 8, wherein the projections are formed in the plate at positions facing the sealing ring.

10. A cylinder injection type fuel injection valve according to claim 8 wherein the hardness of a material for the projections is higher than the hardness of a material to which the projections contact.

11. A cylinder injection type fuel injection valve according to claim 6, wherein a plurality of projections are formed along a circular line in the plate at a side facing the coil assembly.

12. A cylinder injection type fuel injection valve according to claim 11, wherein the projections are formed at positions facing the sealing ring.

13. A cylinder injection type fuel injection valve comprising a valve body of a hollow cylindrical shape, a valve seat having a fuel injection nozzle at its center, which is disposed at an end of the valve body, a valve capable of coming to contact with and separating from the valve seat so as to open and close the injection nozzle, a hollow housing having an end connected to the valve body, a core disposed in the housing, and a coil assembly disposed around the core and inside the housing to cause opening and closing operations of the body, wherein a sealing ring having a hollow cylindrical shape is fitted to a space defined by the housing and the core, in which the coil assembly is disposed, at a side to which a fuel pressure is applied, and an O-ring is disposed at each side of the inside and the outside of the sealing ring, wherein a plate is disposed between the sealing ring and the housing.

14. A cylinder injection type fuel injection valve according to claim 13, wherein the sealing ring and the plate are formed in one piece with a heat-resisting resin.

15. A cylinder injection type fuel injection valve according to claim 13, wherein a plurality of projections are formed along a circular line in the plate at the end face facing the housing.

16. A cylinder injection type fuel injection valve according to claim 15, wherein the projections are formed at positions on the end face of the plate facing the sealing ring.

17. A cylinder injection type fuel injection valve according to claim 13, wherein a plurality of projections are formed along a circular line in each of upper and lower surfaces of the plate.

18. A cylinder injection type fuel injection valve according to claim 17, wherein the projections are formed at positions facing the sealing ring.

19. A cylinder injection type fuel injection valve comprising a valve body of a hollow cylindrical shape, a valve seat having a fuel injection nozzle at its center, which is disposed at an end of the valve body, a valve capable of coming to contact with and separating from the valve seat so as to open and close the injection nozzle, a hollow housing having an end connected to the valve body, a core disposed in the housing, and a coil assembly disposed around the core and inside the housing to cause opening and closing operations of the body, wherein a sealing ring having a hollow cylindrical shape is fitted to a space defined by the housing and the core, in which the coil assembly is disposed, at a side to which a fuel pressure is applied, and an O-ring is disposed at each side of the inside and the outside of the sealing ring, wherein a plate is disposed between the sealing ring and the coil assembly and a second plate is disposed between the sealing ring and the housing respectively.

20. A cylinder injection type fuel injection valve according to claim 19, wherein the sealing ring and the plates disposed at both sides of the sealing ring are formed in one piece with a heat-resisting resin.

* * * * *